3,782,983
AIR ENTRAINMENT COMPOSITIONS FOR
CEMENT MORTARS
Joseph A. Komor, Allentown, Pa., assignor to GAF
Corporation, New York, N.Y.
No Drawing. Filed May 18, 1970, Ser. No. 38,539
Int. Cl. C04b 7/02
U.S. Cl. 106—88                    1 Claim

ABSTRACT OF THE DISCLOSURE

A composition for imparting air entrainment to cement mortars comprising salts of sulfate esters derived from: (a) straight or branched chain alcohols containing 0–65% by weight of ethylene oxide, wherein the alcohol portion has 8–10 carbon atoms, and (b) alkyl aryl alcohols containing 0–65% by weight of ethylene oxide, wherein the alkyl group has 2–7 carbon atoms.

BACKGROUND OF THE INVENTION

Field of the invention

This invention relates to anionic surfactants and particularly relates to surfactants which impart air entrainment characteristics to cement mortars. It specifically relates to air-entrainment surfactants for cement mortars which have alkoxyalkyl or aryl derivatives thereof as the anionic portion of the surfactant and a sulfate group, which is attached as an ester thereto.

Description of the prior art

For many years, surfactants have been used in large quantities as air entrainment agents for concrete and cement mortars. These surfactants, when added to the mortars before or during the mixing operation, cause the air which is mechanically entrained or entrapped to remain as a stable foam in relatively larger quantities than would otherwise occur. Benefits which are derived from stable air entrainment include:

(a) improved freeze-thaw stability,
(b) increased fluidity and workability,
(c) reduced segregation of aggregate,
(d) reduced separation of water from the mortar, and
(e) reduction in density of the hardened cement or concrete.

Cement products having selected levels of air entrainment are utilized in structural and paving concrete, ready-mixed concrete, concrete pipe, and cement blocks. Cement mortars containing entrained air are also utilized for a wide variety of surfacing applications. At least 20,000,000 lbs. of surfactant are used each year.

In general, optimum properties are achieved with 3–6 percent air in concrete and 16–22 percent air in mortars. Air contents are generally controlled by the type and concentration of surfactant, but factors such as the ratio of sand to cement, gravel, and water, the particle size and irregularity of aggregate, the severity and length of mixing, the temperature, the cement additives (retarders, accelerators, etc.), and the size and stability of the foam bubbles all influence the stably maintained air content. For screening purposes, most of these variables are held constant. In investigations which seek optimum use levels, air content is plotted as a function of other variables such as surfactant concentration. Surfactants are generally screened by testing all samples at a constant surfactant content in mortar having the same ingredients and prepared in exactly the same way.

Air entrainment enhances freeze-thaw resistance by a rather simple mechanism. Absorbed water is entrapped in the capillaries between the solid aggregate. It expands upon freezing and causes cracking and surface scaling. However, if bubbles are present in the hardened mortar, they serve as voids into which water can expand when freezing into ice.

Upon thawing, equilibrium is again established as the water seeps back into the capillaries. The bubbles, by functioning as minute expansion chambers, prevent increased internal stress and possible fracturing of the cement or concrete, thereby prolonging the useful life of the cement structure. Because of the success of this technique, air entraining agents have achieved widespread acceptance and are extensively used throughout northern climates.

In addition to improving freeze-thaw properties, entrained air serves as a fluidity aid in unhardened cement mixes or mortar. Fluidity of the mortar is created by increasing the volume of the mix by the air bubbles; in essence, there is an actual separation of the solid particles by the air bubbles, thus furnishing greater fluidity and better workability to the mixture. Fluidity increases with air content.

The presence of air also reduces segregation and bleeding of water from the mortar because the buoyant force of the entrained air restrains downward movement of the cement, gravel and sand. It is necessary, however, to avoid excessive fluidity as a result of a non-optimum air content in order to prevent segregation of the air into larger bubbles and loss of air through rise of bubbles to the surface of the mortar. Sufficient viscosity must be retained in order to keep the foam well dispersed and in suspension until setting occurs. This is normally accomplished by reducing the water and sand content of the mix; the increased cement content offsets the strength loss which would otherwise occur from reduced density and particle-to-particle interaction.

Various air-entraining agents have been proposed, such as black liquor soaps as suggested in U.S. Pat. No. 2,311,289, and sulfonates, Vinsol NVX, and ethylene oxide-condensation products such as disclosed in British Pat. No. 787,187. Vinsol NVX is the most commonly employed surfactant in current use for air entrainment in mortar mixes. Vinsol NVX is the sodium salt of Vinsol resins which in turn are products obtained in the extraction of wood resin from pinewood stumps, as disclosed in U.S. Pat. No. 2,193,026. As described in Kirk-Othmer's "Encyclopedia of Chemical Technology," (2nd ed.), vol. 17, page 477:

> "An aliphatic solvent is used for extracting only terpene and rosin-type materials, whereas aromatic solvents are employed to extract an additional resinous material, insoluble in aliphatic solvents, termed 'Vinsol,' which has found many commercial uses."

U.S. Pat. No. 3,000,246 also teaches the use of small quantities of the sodium salts of N-methyl taurides of tall oil acids for avoiding "false set" in portland cement mortars.

SUMMARY OF THIS INVENTION

It is the object of this invention to provide a new and useful anionic surfactant as a composition comprising sulfate esters of alkyl and alkyl aryl ethoxylates which are extremely efficient in the form of soluble salts for entraining air in aqueous cement mixtures.

In satisfaction of the foregoing objects and advantages, there has now been discovered that when straight-chain or branched-chain primary alcohols, which are based upon alcohols having 8–10 carbon atoms, and which contain 0–65% by weight of ethylene oxide, and alkyl aryl alcohols, containing 0–65% ethylene oxide and an alkyl group or groups having a total of 2–7 carbon atoms, are converted to their corresponding sulfates by esterification with sulfuric acid or derivatives thereof, and neutralized to form their salts, the resultant anionic surfactants are extremely effective air-entraining agents for aqueous cement mixtures.

DESCRIPTION OF THE INVENTION

The sulfate esters for use in the compositions of this invention may be described by the following empirical formula:

$$R-(OCH_2CH_2)_nSO_4A$$

wherein R is an alkyl group of about 8 to 10 carbon atoms or an alkyl-substituted aryl group such as phenyl or naphthyl wherein the alkyl group contains 2 to 7 carbon atoms and may be straight or branched chains, $n$ is zero or an integer of one or above, preferably zero up to about 10 and A is H or a salt forming cation selected from the group consisting of alkali metal such as sodium, potassium or lithium; $-NH_4$ and mono-, di-, or tri-lower (1 to 6 carbon atoms) alkyl or alkylol amino and heterocyclic secondary amino groups. Preferred amines whose salts may be used according to the above formula are trimethylamine, triethylamine, diethanolamine, triethanolamine, pyridine, piperidine and morpholine. In general, in the formula, the value of $n$ is limited by the fact that the ethoxylate groups ($OCH_2CH_2$) should constitute from 0 up to about 65% by weight of the sulfate ester. Hence the values of $n$ will vary depending on the other components of the molecule.

Straight-chain alcohol ethoxylates, which are described according to this formula in which ethylene oxide is 23–60% by weight, are particularly effective air entraining agents when converted to their corresponding sulfates and neutralized either by direct addition of alkaline materials or by in situ neutralization effected by blending on an alkaline substance such as portland cement. Also it should be noted that certain sulfate esters are useful which contain no ethoxylate groups.

According to this invention, it has been found that the narrow class defined above provides consistently good air-entrainment properties in the composition of this invention. As shown hereinafter, the air entrainment values of the above compounds are above about 10%.

Specific compounds falling in the above class include the following:

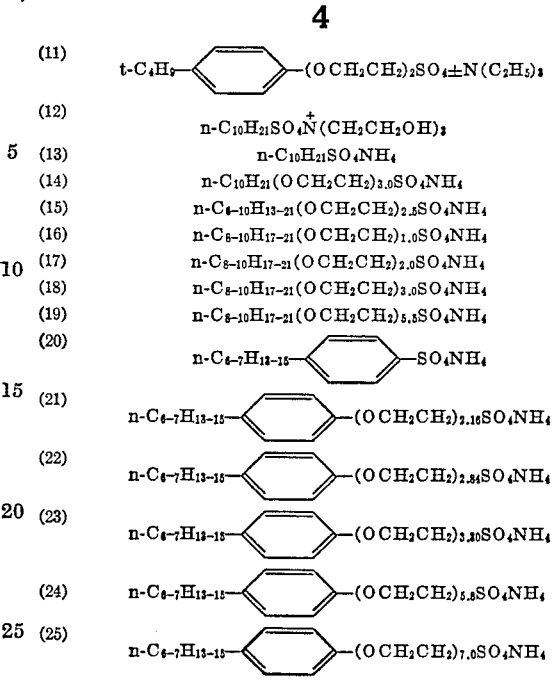

Obviously, compounds falling within the above class, other than those named, may also be employed.

The compositions of this invention may be prepared by ethoxylating the basic alcohols or alkyl phenols with ethylene oxide under known conditions to obtain the oxyethylene content desired. These ethoxylated compounds are then sulfated, in known manner, as by reaction with sulfamic acid, sulfuric acid, sulfur trioxide or chlorosulfonic acid, to convert them to the desired sulfate esters. The ammonium salts may be formed directly by sulfation with sulfamic acids, and other salts obtained by neutralization of the free acid form of sulfate ester with alkali metal hydroxides, carbonates, etc., or salt forming amines.

The extreme effectiveness which is apparently imparted by the sulfate group is entirely unexpected and would not normally be attempted because of the known deleterious effects of sulfates upon the strength and endurance of cement structures. It is believed that non-existent or negligible deleterious effects upon the hardened cellular cement is the result of very small amounts being required to achieve a useful level of stable air entrainment. Surfactant compositions in the alkali metal salt form and in the ammonium salt form gave similar performance as air-entrainment agents.

EXAMPLES 1–28

Selected compositions were evaluated in a standard mortar mix according to the following screening test method, based on field experience which has shown that a surfactant concentration giving 16–22% air in cement mortar generally gives 3–6% air in concrete mortars, both being optimum air contents. Compositions were evaluated in cement mortars prepared according to the following formula in which all surfactants were 0.01% of the dry portland cement, by weight:

```
                                              Parts by weight
Ottawa sand, 20–30 mesh in acordance with ASTM
  spec. C 185–59 _____  180
Type I, II, or III, cement from the Alpha Portland
  Cement Co. _____    60
Water and surfactant solution _____  36
```

A very exact test procedure was followed to avoid as much random variation as possible. Ingredients were weighed into a 400 ml. beaker, partially blended by 2 or 3 swirls with a spatula, and positioned directly below a drill press-driven agitator. The agitator was lowered and positioned as close to the bottom of the beaker as possible without touching. Mixtures were stirred with a 4-slotted circular agitator having a 2-inch diameter stirrer for 3 minutes at 1360 r.p.m. For the first 20–30 seconds of agitation, the beaker was moved in a horizontal circular pattern, so that the agitator moved about the periphery of the beaker, in order to effect complete blending of ingredients. Thereafter, the agitator was positioned directly at the center of the beaker, without changing its elevation, for the duration of the 3-minute period. The beaker was then removed from the drill press stand, mixed once with a spatula, and the contents transferred to a tared container of known volume.

Excess mortar was removed by multiple passes of a straight edge over the top rim of the container. The sides and bottom of the filled vessel were dried with paper tissue and the weight to the nearest $\frac{1}{10}$ gram was obtained. Percent air was calculated by using the following expression:

$$\text{Percent air} = \frac{(T-t)100}{T}$$

where $T$=theoretical weight of vessel and mortar and $t$=observed weight of vessel and mortar. The theoretical weight of the mortar assumes that the sand, cement, water, and composition of this invention all packed as efficiently as possible without any voids being present.

Twenty-seven compositions and one standard air-entraining agent, Vinsol NVX, were tested according to this test method, using 0.01% surfactant, based on the weight of dry cement. The experimental results are shown in the following table in which the percentage of ethylene oxide in the nonionic portion of the surfactant is given.

The performance capabilities for the compositions of this invention were determined by comparative evaluations under these rigorously standardized conditions, as set forth in the following illustrative examples.

| Example number | Composition | Air entrained by using composition in mortar at 0.01% by wt. of dry portland cement, percent | Ethylene oxide, percent by wt. in nonionic intermediate |
|---|---|---|---|
| 1 | n-C$_8$H$_{17}$(OCH$_2$CH$_2$)$_{2.5}$SO$_4$NH$_4$ | 12.01 | 49 |
| 2 | n-C$_{10}$H$_{21}$(OCH$_2$CH$_2$)$_{2.0}$SO$_4$NH$_4$ | 13.47 | 39 |
| 3 | n-C$_{10}$H$_{21}$(OCH$_2$CH$_2$)$_{3.0}$SO$_4$NH$_4$ | 13.32 | 48 |
| 4 | n-C$_{12}$H$_{25}$(OCH$_2$CH$_2$)$_{3.5}$SO$_4$NH$_4$ | 7.20 | 48 |
| 5 | n-C$_{14}$H$_{29}$(OCH$_2$CH$_2$)$_{4.0}$SO$_4$NH$_4$ | 3.76 | 47 |
| 6 | n-C$_{6-10}$H$_{13-21}$(OCH$_2$CH$_2$)$_{2.5}$SO$_4$NH$_4$ | 16.31 | 56 |
| 7 | n-C$_{8-10}$H$_{17-21}$(OCH$_2$CH$_2$)$_{1.0}$SO$_4$NH$_4$ | 15.63 | 28 |
| 8 | n-C$_{8-10}$H$_{17-21}$(OCH$_2$CH$_2$)$_{2.0}$SO$_4$NH$_4$ | 15.36 | 44 |
| 9 | n-C$_{8-10}$H$_{17-21}$(OCH$_2$CH$_2$)$_{3.0}$SO$_4$NH$_4$ | 15.13 | 54 |
| 10 | n-C$_{8-10}$H$_{17-21}$(OCH$_2$CH$_2$)$_{5.5}$SO$_4$NH$_4$ | 10.97 | 68 |
| 11 | n-C$_8$H$_{13}$SO$_4$Na | 5.7 | 0 |
| 12 | n-C$_{10}$H$_{21}$SO$_4$Na | 19.6, 18.9 | 0 |
| 13 | n-C$_{10}$H$_{21}$(OCH$_2$CH$_2$)$_2$SO$_4$NH$_4$ | 13.3 | 38 |
| 14 | n-C$_{8-10}$H$_{17-21}$(OCH$_2$CH$_2$)$_{2.5}$SO$_4$Na | 17.2 | 48 |
| 15 | n-C$_{8-10}$H$_{17-21}$(OCH$_2$CH$_2$)$_{2.5}$SO$_4$NH$_4$ | 17.1, 17.3 | 49 |
| 16 |  n-C$_{6-7}$H$_{13-15}$—⬡—(OCH$_2$CH$_2$)$_{10.0}$SO$_4$NH$_4$ | 7.02 | 73 |
| 17 |  n-C$_9$H$_{19}$—⬡—(OCH$_2$CH$_2$)$_{4.0}$SO$_4$NH$_4$ | 5.80, 5.80 | 47, 47 |
| 18 |  n-C$_9$H$_{19}$—⬡—(OCH$_2$CH$_2$)$_{9.5}$SO$_4$NH$_4$ | 4.80 | 67 |
| 19 |  n-C$_9$H$_{19}$—⬡—(OCH$_2$CH$_2$)$_{20.0}$SO$_4$NH$_4$ | 5.71 | 81 |
| 20 |  n-C$_{6-7}$H$_{13-15}$—⬡—SO$_4$NH$_4$ | 14.49 | 0 |
| 21 |  n-C$_{6-7}$H$_{13-15}$—⬡—(OCH$_2$CH$_2$)$_{2.16}$SO$_4$NH$_4$ | 17.67, 17.67 | 37, 37 |
| 22 |  n-C$_{6-7}$H$_{13-15}$—⬡—(OCH$_2$CH$_2$)$_{2.84}$SO$_4$NH$_4$ | 17.17 | 43 |
| 23 |  n-C$_{6-7}$H$_{13-15}$—⬡—(OCH$_2$CH$_2$)$_{3.0}$SO$_4$NH$_4$ | 14.14 | 47 |
| 24 |  n-C$_{6-7}$H$_{13-15}$—⬡—(OCH$_2$CH$_2$)$_{5.50}$SO$_4$NH$_4$ | 11.87 | 61 |
| 25 |  n-C$_{6-7}$H$_{13-15}$—⬡—(OCH$_2$CH$_2$)$_{7.00}$SO$_4$NH$_4$ | 10.46 | 66 |
| 26 | 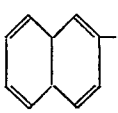 naphthyl—(OCH$_2$CH$_2$)$_2$SO$_4$NH$_4$ | 5.5 | 37 |
| 27 |  t-C$_4$H$_9$—⬡—(OCH$_2$CH$_2$)$_2$SO$_4$NH$_4$ | 14.5 | 40 |
| 28 | Vinsol NVX (sodium resinate) | 3.50 | 0 |

As is evident from the results in this table, the compositions of this invention are markedly more effective than the sodium resinate, Vinsol NVX, which is the most widely used air-entraining agent on the market today. This table also provides the basis for the class of compounds defined above.

Additional tests were made to ascertain the operable ranges and optimum concentrations for the surfactants of this invention in air-entrained cements. The standard batch concentrations of mortar which were selected are those given in ASTM C185 as being 350 grams of cement, 1400 grams of standard sand, and sufficient water to give a flow between 80 and 95 percent on the flow table of paragraph 3 of ASTM C185. Examples 29–37 illustrate air-entraining characteristics in Type IA cement, and Examples 38–46 illustrate air-entraining characteristics in Type IIIA cement mortars.

The surfactant used in Examples 35–37 and 44–46 is Vinsol NVX, the sodium salt of Vinsol, as in Example 28. The surfactant used in Examples 29–31 and 38–40 is herein defined as $$n\text{-}C_{8-10}H_{17-21}(OCH_2CH_2)_{2.5}SO_4NH_4$$

which is used in Example 15, prepared from Alfol 810, which is a mixture of $C_8$ and $C_{10}$ linear alcohols, by ethoxylation, sulfation and neutralization. This Alfol derivative is identified in the table below as Agent B. Alfol is a trademark of the Continental Oil Company and designates a series of synthetic linear alcohols whose accompanying number designates the chain length of the component linear alcohols. The surfactant used in Examples 32–34 and 41–43 is herein defined as a binary mixture consisting of 85 parts of the product of Examples 29–31 and 38–40 and 15 parts of

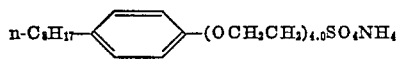

This binary mixture is identified in the table below as Agent T.

EXAMPLES 29–37

Samples of Type IA cement mortars were prepared according to ASTM test C185 and C226 and various amounts of surfactant added to provide mortars of 350 grams cement, 1400 grams standard sand, and sufficient water to give 80–95% flow rate, varying in air content yet having acceptable fluidity.

EXAMPLE 38–46

Samples of Type IIIA cement mortar were prepared according to ASTM test C185 and C226, and various amounts of surfactant were added to provide mortars of 350 grams cement, 1400 grams standard sand, and water to give an 80–95% flow rate, varying in air content yet having acceptable fluidity.

The properties of the mortars were determined and are given in the following table in which B is used for the above-identified Alfol derivative and T is used for the above-identified binary mixture.

| Example | Agent | Percent agent by wt. of cement | Flow rate, percent | Air content, percent by volume |
|---|---|---|---|---|
| 29 | B | .00129 | 80 | 16 |
| 30 | B | .00170 | 88.5 | 19.4 |
| 31 | B | .00220 | 95 | 22 |
| 32 | T | .00128 | 82.5 | 16 |
| 33 | T | .00144 | 87.5 | 19.05 |
| 34 | T | .00170 | 95 | 22 |
| 35 | Vinsol NVX | .0082 | 80 | 16 |
| 36 | do | .00965 | 87.5 | 19.05 |
| 37 | do | .01155 | 95 | 22 |
| 38 | B | .00225 | 80 | 16 |
| 39 | B | .00315 | 87.5 | 19 |
| 40 | B | .00550 | 95 | 22 |
| 41 | T | .00210 | 80 | 16 |
| 42 | T | .00275 | 87.5 | 19 |
| 43 | T | .00345 | 95 | 22 |
| 44 | Vinsol NVX | .0202 | 80 | 16 |
| 45 | do | .0244 | 88 | 19.2 |
| 46 | do | .0286 | 95 | 22 |

In addition, the physical properties in the following table were determined on the samples containing the optimum concentration of the air-entraining agents:

| | Concentration, percent | Time of setting Gillmore needles | | | | Autoclave expansion, percent | Compressive strength, 1 cement, 2.75 standard sand (average of 3 specimens, lbs. per sq. in.) in— | | | Mixing water, percent |
|---|---|---|---|---|---|---|---|---|---|---|
| | | Initial | | Final | | | 3 days | 7 days | 28 days | |
| | | Hrs. | Min. | Hrs. | Min. | | | | | |
| Example: | | | | | | | | | | |
| 30 | 0.0017 | 2 | 55 | 5 | 35 | 0.29 | 2,210 | 3,260 | 4,325 | 46.0 |
| 33 | 0.0014 | 3 | 15 | 5 | 45 | 0.28 | 2,395 | 3,340 | 4,665 | 46.0 |
| 36 | 0.0097 | 3 | 40 | 6 | 10 | 0.31 | 2,410 | 3,800 | 4,335 | 46.0 |
| No additive | | 3 | 50 | 5 | 50 | 0.28 | 2,830 | 4,060 | 5,535 | 47.0 |
| | | Min. | | Max. | | Max. | Min. | Min. | Min. | |
| ASTM limits | | 60 | | ¹ 10 | | 0.80 | 900 | 1,500 | 2,800 | |

¹ Hours.

These results show that, at comparable levels of flow rate and air content, the surfactants of this invention are several times as effective as Vinsol NVX. The ratio of "percent Vinsol NVX" to "percent Alfol derivative" at comparable flow rates changes from 6.4 to 5.3 for Examples 29–31 and from 9.0 to 5.2 for Examples 38–40, as the flow rate is increased. The ratio of "percent Vinsol NVX" to "percent binary mixture" at comparable flow rates changes from 6.4 to 6.8 for Examples 32–34 and from 9.6 to 8.3 for Examples 41–43, as the flow rate is increased. These results indicate that the Alfol derivative and binary mixtures of this invention produce air entrainment and flow rates which are closely comparable to those produced by Vinsol NVX by use of such smaller amounts of additives, namely, 11% to 20% for the Alfol derivative and 10% to 16% for the binary mixture, of the Vinsol NVX requirements.

The invention has been described with reference to certain preferred embodiments. However, the invention is not to be considered as limited thereto.

What is claimed is:

1. A cementitious portland cement composition having enhanced air entrainment characteristics consisting essentially of portland cement and the free acid form of sulfate esters present in an amount up to about 0.01% by weight, based on the weight of dry portland cement in said composition, said sulfate esters having the empirical formula:

$$R\text{—}(OCH_2CH_2)_nSO_4H$$

wherein R is selected from the class consisting of alkyl groups of 8 to 10 carbon atoms and an alkyl-substituted aryl group, wherein the alkyl group contains 2 to 7 carbon atoms, n is zero or an integer of 1 or above, whereby the ethylene oxide content is zero to 65% by weight of R—(OCH$_2$CH$_2$)$_x$.

References Cited
UNITED STATES PATENTS

| | | | |
|---|---|---|---|
| 3,480,556 | 11/1969 | De Witt et al. | 260—458 |
| 3,393,219 | 7/1968 | Myerly et al. | 260—458 |
| 3,265,722 | 8/1966 | Dudley | 260—458 |
| 3,054,820 | 9/1962 | de Jong et al. | 260—458 |
| 2,979,415 | 4/1961 | Taylor | 106—88 |
| 2,892,727 | 6/1959 | MacPherson | 106—88 |

OTHER REFERENCES

Tea and Desch: "The Chemistry of Cement and Concrete," Edward Arnold Sons, pp. 517–518 (1956).

Taylor, W. H.: "Concrete Technology and Practice," American Elsevier, 250, 473 (1965).

JAMES E. POER, Primary Examiner

U.S. Cl. X.R.

106—90